P. J. FITZGERALD.
GASKET.
APPLICATION FILED MAY 22, 1919.
1,338,617.
Patented Apr. 27, 1920.
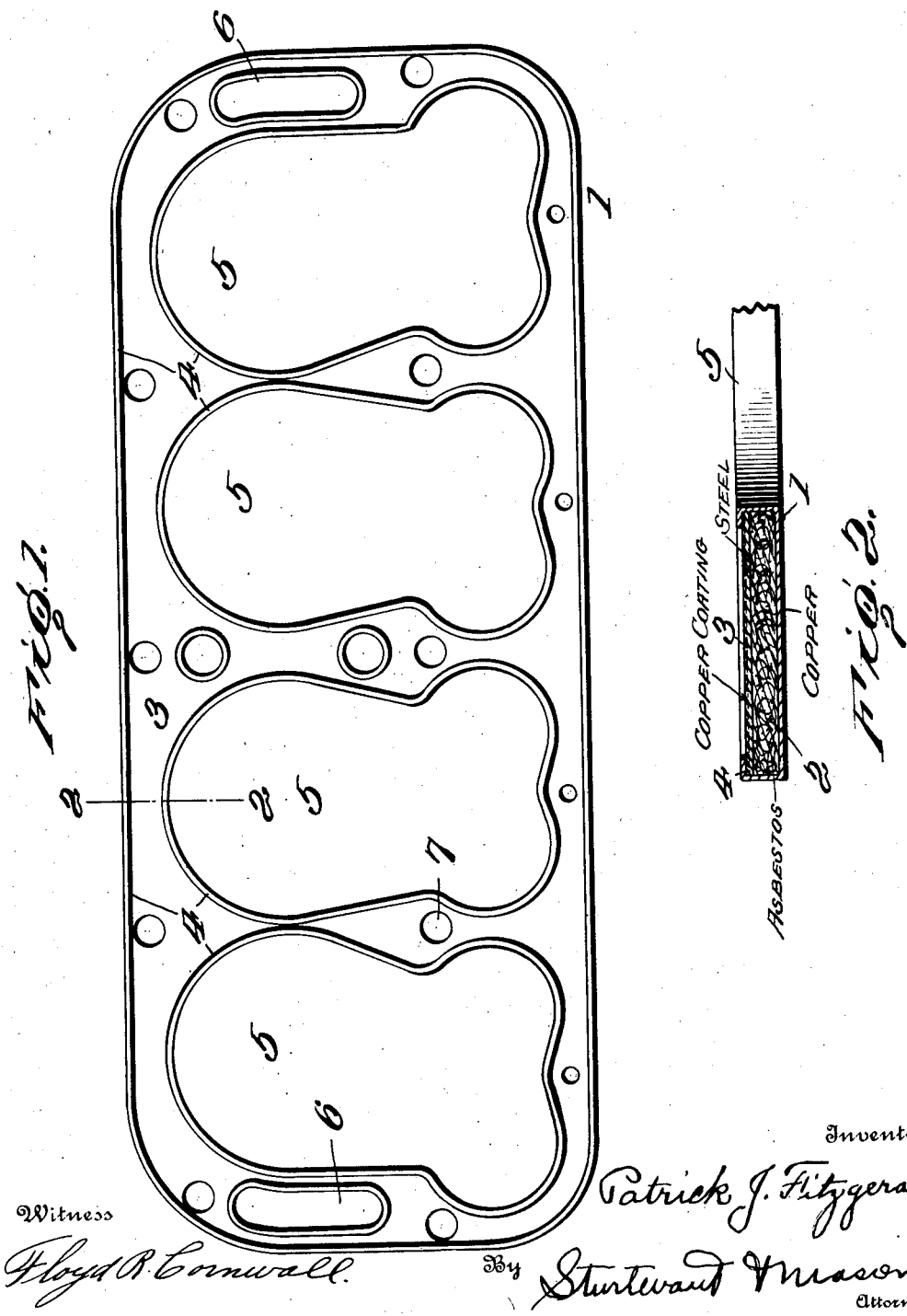

UNITED STATES PATENT OFFICE.

PATRICK J. FITZGERALD, OF TORRINGTON, CONNECTICUT, ASSIGNOR TO THE FITZGERALD MFG. COMPANY, OF TORRINGTON, CONNECTICUT, A CORPORATION OF CONNECTICUT.

GASKET.

1,338,617.        Specification of Letters Patent.       Patented Apr. 27, 1920.

Application filed May 22, 1919. Serial No. 298,936.

*To all whom it may concern:*

Be it known that I, PATRICK J. FITZGERALD, a citizen of the United States, residing at Torrington, in the county of Litchfield, State of Connecticut, have invented certain new and useful Improvements in Gaskets, of which the following is a description, reference being had to the accompanying drawing and to the figures of reference marked thereon.

This invention relates to the construction of gaskets adapted for general use, and more particularly for use in internal combustion engines where the gasket is exposed to the action of excessive heat or contact with oil, water, or other liquid, or for sealing a joint which is required to hold pressure.

An object of the invention is to provide a metal-covered packing gasket used in connection with cast metal parts, which gasket is rust-proof, and which includes as one of its elements a metallic section having substantially the same coefficient of expansion as the cast metal parts with which it is associated.

Another object of the invention is to provide a packing gasket having a central core or section of asbestos or the like which is completely inclosed by metal parts whereby leakage is prevented through the asbestos packing when said gasket is subjected to extreme pressure.

These and other objects will in part be obvious and will in part be hereinafter more fully disclosed.

In the drawings, which show by way of illustration one embodiment of the invention:—

Figure 1 represents a plan view of one form of my improved gasket; and

Fig. 2 shows an enlarged detail taken on the line 2—2 of Fig. 1.

Referring more particularly to the drawings, the gasket illustrated is composed of a copper facing 1 and an inner member 2 of asbestos, or other suitable packing means. The opposite side of the packing means is adapted to be faced by a copper clad steel insert 3 which takes the heat better than either brass or copper and will not crack in the expansion or contraction of the motor. This facing or insert 3 is held firmly in place by having the edges of the copper bottom 1 drawn over the same to provide an over-lap 4. This over-lap or binding on the outer edge is an improvement over the cylinder head gaskets made up to the present time. The over-lap holds the asbestos firmly in place, binding the top plate or insert 3 securely and making an indestructible gasket that will neither leak nor blow on the highest compression motor.

These three elements, which are of the same design, are provided with one or more openings, 5, corresponding to the shape of the cylinder bore, the number of openings depending upon the number of cylinders in the engine block. There are also provided openings 6, corresponding to the water passages in the cylinder jacket, which openings 6 are rendered leak-proof by having the edges of the copper facing 1 lapped over. This is an improvement over the present type of gasket which either omit the same or provide a separate copper insertion making a double thickness of metal which will not allow the gasket to compress evenly and as a result, blows and leaks are numerous. In addition there are openings 7 for the usual bolt holes through which are adapted to pass the bolts attaching the cylinder head to the cylinder block. It is obvious that the configuration of the gasket and the number and shape of the openings therein is immaterial to the invention herein set forth.

As shown in detail in Fig. 2, the copper clad steel insert 3 is composed of a steel body, copper clad on one or both sides. This construction affords a gasket facing, the main body portion of which is composed of steel, with a co-efficient of expansion and contraction more nearly corresponding to that of the engine cylinder than would be the case were the gasket composed entirely of copper, brass, or material now in use. At the same time, this steel facing being copper clad is in addition absolutely rustless. Another advantageous property of such a facing resides in the fact that it has a much higher heat melting point, is more durable, and can be more cheaply made.

By making the bottom facing 1 of copper, it is possible to draw or roll the copper edges thereof to overlap the copper and steel insert 3 to provide a leak-proof beaded edge for all openings, and to also hold the insert firmly in place. In this manner a most compact gasket is provided.

It is obvious that minor changes in the details of construction may be made without departing from the spirit of the invention as set forth in the appended claim.

Having thus described my invention, what I claim as new and desire to secure by Letters Patent, is:

A gasket adapted to pack the joint between the cylinder block and head of an internal combustion engine, comprising an inner packing, a facing insert of copper clad steel, a copper facing, said packing, insert and facing having a plurality of openings for the cylinders, and water passages, said copper facing overlapping the exposed edges of said packing and insert about said openings and at the edges of the gasket.

In testimony whereof I affix my signature in the presence of two witnesses.

PATRICK J. FITZGERALD.

Witnesses:
BERTRAND C. PECK,
J. A. PECK.